United States Patent [19]

Carruth

[11] Patent Number: 5,662,378
[45] Date of Patent: Sep. 2, 1997

[54] CAR SEAT WITH TRAY FOR USE BY CHILDREN

[76] Inventor: Adrain E. Carruth, P.O. Box 33, Mt. Vernon, Ill. 62864

[21] Appl. No.: 562,819

[22] Filed: Nov. 27, 1995

[51] Int. Cl.⁶ ............................. A47D 1/10; B60N 2/26; B60N 2/28
[52] U.S. Cl. ............ 297/256.15; 297/487; 297/188.18; 297/188.19; 297/148
[58] Field of Search ................... 108/26, 90, 60; 297/256.15, 188.01, 487, 188.14, 188.18, 188.19, 188.2, 148, DIG. 6, 219.12

[56] References Cited

U.S. PATENT DOCUMENTS

| | | |
|---|---|---|
| 2,362,465 | 11/1944 | Carner. |
| 2,457,725 | 12/1948 | Rhowmine. |
| 2,672,182 | 3/1954 | Gwin et al. ............................. 297/188.2 |
| 2,684,110 | 7/1954 | Stone. |
| 2,865,697 | 12/1958 | Staley. |
| 3,143,374 | 8/1964 | Carboni. |
| 3,148,636 | 9/1964 | Bloomquist ............................. 108/26 |
| 3,512,829 | 5/1970 | Paris. |
| 4,343,510 | 8/1982 | Cone. |
| 4,449,750 | 5/1984 | Pultman. |
| 4,540,219 | 9/1985 | Klinger. |
| 4,548,440 | 10/1985 | Meslin et al. ............................. 108/26 |
| 4,595,246 | 6/1986 | Bross ............................. 108/60 |
| 4,627,363 | 12/1986 | Jones ............................. 108/90 |
| 4,908,066 | 3/1990 | Taylor et al. ............................. 108/26 |
| 5,081,936 | 1/1992 | Drieling. |
| 5,100,001 | 3/1992 | Brooks. |
| 5,188,421 | 2/1993 | Arseneault. |
| 5,275,464 | 1/1994 | Eichhorn et al.. |
| 5,294,172 | 3/1994 | Dubus. |
| 5,327,838 | 7/1994 | Beltman. |
| 5,332,292 | 7/1994 | Price et al.. |

Primary Examiner—Milton Nelson, Jr.
Assistant Examiner—Anthony D. Barfield
Attorney, Agent, or Firm—Grace J. Fishel

[57] ABSTRACT

A child's car seat with a shield. A tray, preferably removable, is embedded in the shield. An elongated cover is wrapped around the shield for hiding the tray. The cover has releasable securing mechanisms for mated engagement with securing mechanisms on the shield for retaining the cover in wrapped around condition and for removing it entirely. In a preferred form, the tray is divided into sections with at least one of the sections having a circular cross-section and the cover has an aperture in registry with the section having a circular cross-section when the cover is wrapped around the shield and secured with the mating securing mechanisms.

3 Claims, 2 Drawing Sheets

CAR SEAT WITH TRAY FOR USE BY CHILDREN

BACKGROUND OF THE INVENTION

1. Field of the Invention

The present invention relates to a child's car seat of the kind having a safety shield in front of the child, said car seat having a tray embedded in the shield and hidden with a cover when not in use.

2. Brief Description of the Prior Art

It is the law in the United States that children below a certain age must be buckled in car seats while they are traveling in an automobile. When a child is buckled in a car seat, his or her movements are very confined. If the child drops his or her toy, cookie, bottle or the like, it must be retrieved by someone else. If the only person not buckled in a child's car seat is the driver, the retrieval of lost items is very difficult, requiring frequent stops or dangerous maneuvers while the car is in motion. For this reason, notwithstanding the law and the possibility that the driver will be ticketed for a seat belt violation or found negligent in the event of an accident, some people do not buckle their children into a child's car seat. These violations are particularly likely to occur on long trips as it difficult to keep a small child happy in a car seat for very long.

The problem of how to keep a child occupied while strapped in a child's car seat has not gone unnoticed. There are infant seat attachments, such as described in U.S. Pat. No. 4,540,219 to Klinger, that wrap around a safety shield of a child's car seat. Toys and the like can be attached with VELCRO to the wrapper within reach of the child. These wraps, however, do not provide a secure play space for the toy when it is detached from the wrapper, nor do they provide a place for food. What is needed is an container for toys and food within easy reach of a child buckled in a child's car seat, such a container, however, must not present a safety hazard in case of a sudden stop. In addition, to maintain novelty and interest of the child, it is important that the container with the goodies be selectively covered and uncovered at times judged propitious by the parent.

SUMMARY OF THE INVENTION

In view of the above, it is an object of the present invention to provide a child's car seat that promotes the use of car seats, even on long trips, by providing a container for toys and food within easy reach of a child that does not present a safety hazard. It is another object to provide a child's car seat of the kind having a safety shield with a tray embedded in the shield that can be filled with toys and food and covered and uncovered as a pastime for the amusement of a child whose movements are severely limited. Other objects and features of the invention will be in part apparent and in part pointed out hereinafter.

In accordance with the invention, a tray is added to a child's car seat of the kind having a bottom upon which a child can be seated, side arms and a shield that can be moved between a position in front of the child to a position above or to the side of the child. The shield has top and bottom surfaces and front and rear edges with a recess in the top surface for receipt of the tray, preferably flush with the top surface of the shield. The tray can be divided into sections for holding toys, food, beverage containers and the like. An elongated cover of sheet material with first and second ends is wrapped around the front, top and rear of the shield for hiding the tray. An aperture may be provided in the cover in registry with one or more of the tray sections when the cover is wrapped around the shield (e.g., the aperture may be aligned with a section having a round cross-section for holding a bottle, cup or the like). The cover has releasable securing means on the first and second ends for making mated engagement with securing means on the bottom or front and rear edges of the shield for retaining the cover in wrapped around condition and for removing it entirely.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
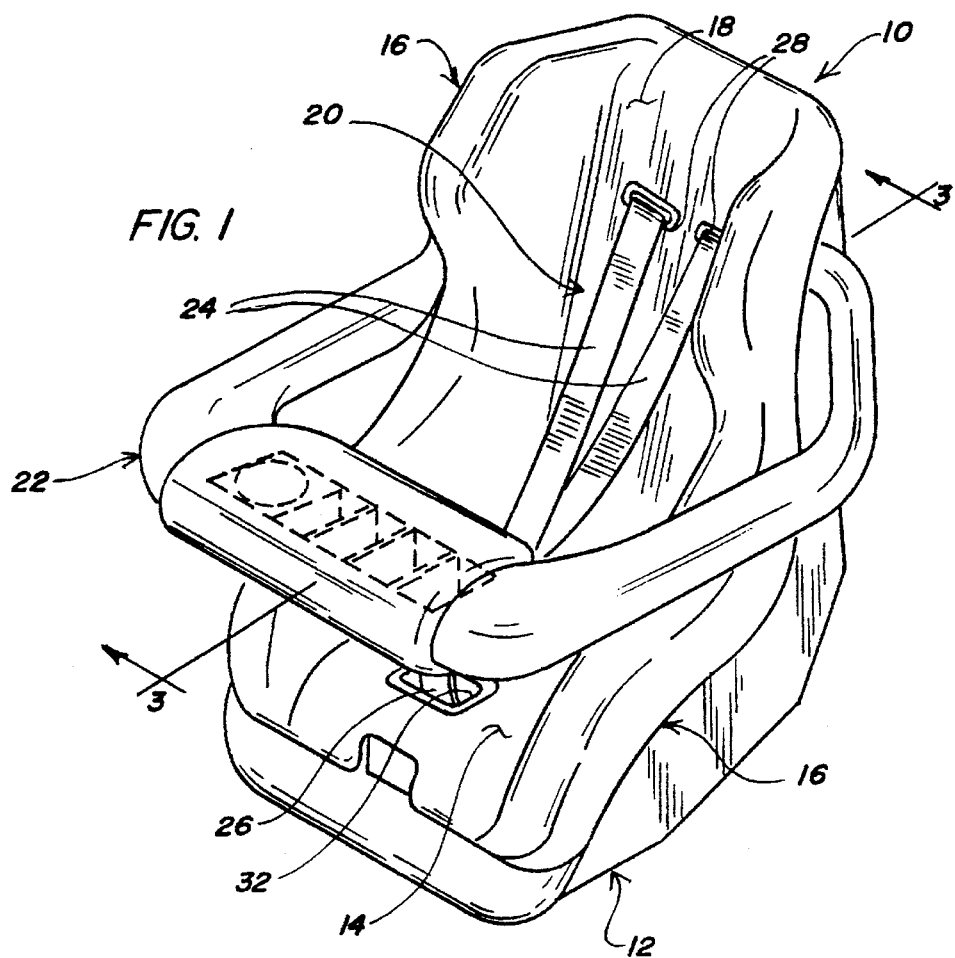
FIG. 1 is a perspective view of a child's car seat having a safety shield with an embedded tray in accordance with the present invention.
Figure 3:
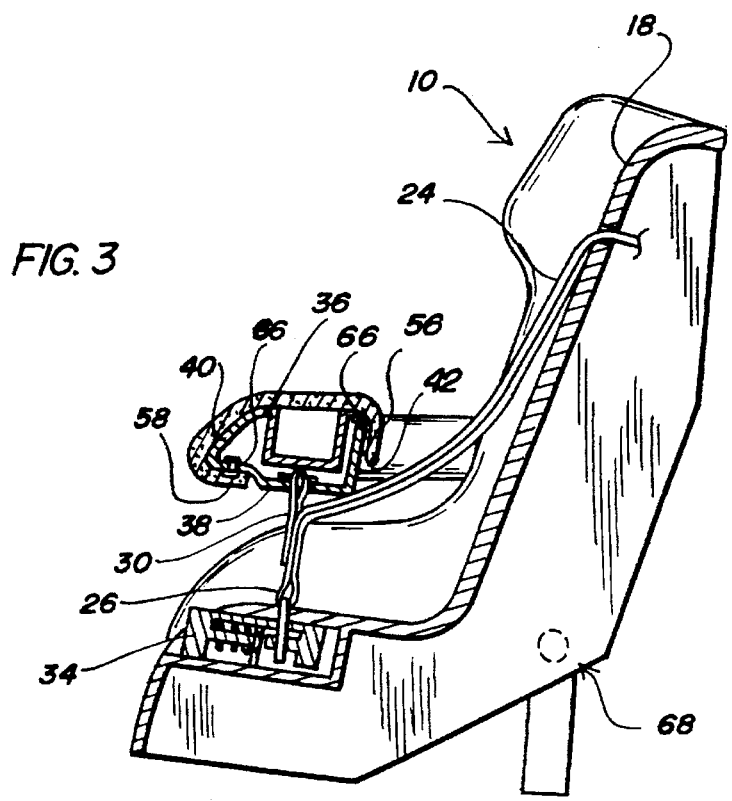

Referring to the drawings more particularly by reference number, reference character 10 identifies a child's car seat in accordance with the present invention. Car seat 10 includes a base 12, the lower surface of which is adapted to be supported on a vehicle seat and the upper surface of which forms a chair bottom 14 upon which a child can be seated. A pair of side arms 16 are attached along opposite sides of base 12. When car seat 10 is a toddler's car seat, a back 18 is attached along the rear of base 12, rising higher than the child's head. Side arms 16 are also attached to back 18 forming a shell enclosing the child seated on chair bottom 14. Car seats for older children are sometimes called co-pilot seats or booster seats and have base 12 and side arms 16 with a low back 18 or no back at all. The seat belts in the vehicle are used to secure a toddler's car seat while a harness 20 is provided for securing the child in the car seat. In booster seats, the seat belts in the vehicle are used for securing the child in the seat.

A shield 22 is attached to side arms 16. Shield 22 is movable between a position in front of the child to a position above or to the side of the child. In the form illustrated in the drawings, shield 22 is a U-shaped member pivotally mounted at its terminal ends to the outside of side arms 16, high along back 18, so as to be movable to a position above the child's head. Shield 22 does not have to be U-shaped and may take the form of a padded bar, pivotally mounted at one of its terminal ends to side arms 16 at about elbow height. The padded bar may be split intermediate its ends and pivotally mounted on both ends to side arms 16. A typical car seat of this kind is described in U.S. Pat. No. 4,754,999 wherein the sections pivot upwardly. Other ways to attach shield 22 to arms 16 are described in U.S. Pat. Nos. 4,671,574, 4,643,474 and 5,275,464, which list is not exhaustive and is intended to indicate the diversity of ways in which shield 22 may be attached to side arm(s) 16 in car seats that may be improved in accordance with the present invention.

With continuing reference to the drawings, car seat 10 is a toddler's car seat with harness 20 having two shoulder straps 24 and a crotch strap 26 joined at one of the ends of each shoulder strap. A pair of slots 28 in back 18 (or a plurality of pairs for height adjustment) accept the shoulder straps which pass through to the rear of back 18. Adjustment means (not shown) are conventionally provided on the rear of back 18 or underside of base 12 for adjustably retaining the other ends of shoulder straps 24. Means 30 (e.g., a strap) are provided on the underside of shield 22 for retaining the other ends of the shoulder straps 24 and crotch strap 26. A slot 32 is provided in chair bottom 14 through which the other end of crotch strap 26 passes and a releasable latching means 34 is furnished on the underside of base 12 in alignment with slot 32 for securing the other end of crotch strap 26 to base 12.

Shield 22 has top and bottom surfaces 36, 38, respectively, and front and rear edges 40, 42, respectively. A recess 44 is provided in top surface 36 within which is received a tray 46, preferably removable, and preferably so that the top edge of the tray is flush with the top surface 36 of shield 22. Tray 46 may be nearly as deep as shield is thick for use as described below. Tray 46 may be formed of a plurality of separately removable sections 48 or may be divided into a plurality of sections by fixed or removable dividers 50. One of the sections may have a circular cross-section 52, configured for holding a cup, bottle or other item with a generally cylindrical bottom.

An elongated cover 54 of sheet material with first and second ends 56, 58, respectively, is provided for wrapping around front, top and rear of shield 22. Cover 54 forms a top over recess 44 and tray 46 so that car seat 10 looks like a conventional car seat with cover 54 wrapped around the shield. Cover 54 preferably includes an outer layer 60 of washable fabric over an inner layer 62 of padding material. Releasable securing means 64 such as snaps, hook and pile fasteners (e.g., VELCRO), etc. are attached on first and second ends 56, 58 of cover 54 for making mated engagement with securing means 66 of opposite gender on bottom surface 38, front edge 40 or rear edge 42 of shield.

Figure 2:
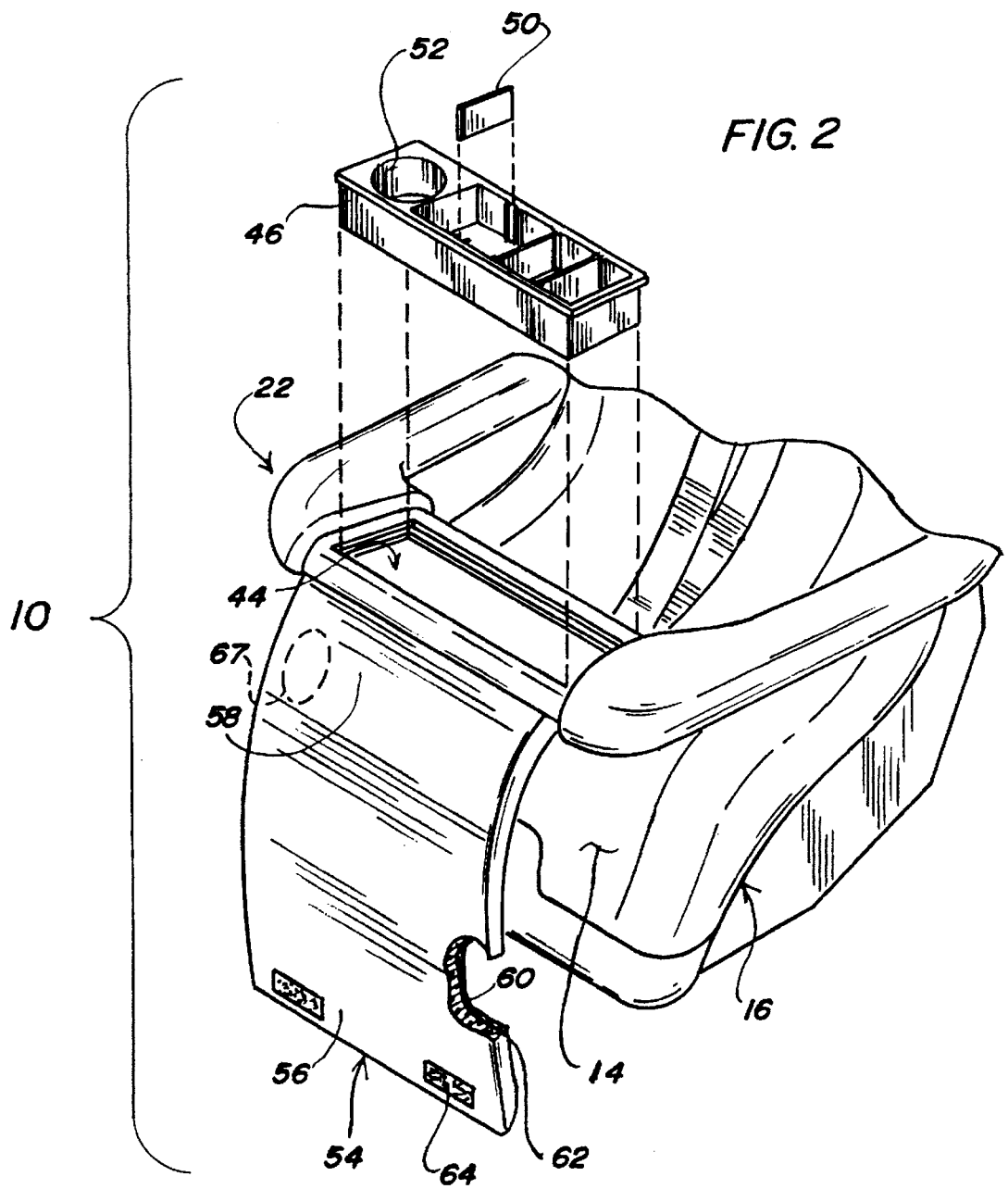
FIG. 2 is a view, with the tray exploded and with the back and cover partly broken away, of the child's car seat showing a cover selectively detached from a rear edge of the safety shield to reveal the tray; and, FIG. 3 is a sectional view taken along line 3—3 in FIG. 1.

An aperture 67 may be provided in cover 54 as shown in broken lines in FIG. 2. Aperture 67 is in registry with one or more of sections 48 in tray 46 when the cover is wrapped around shield 22 and securing means 64 and 66 are mated. In a preferred embodiment, aperture 67 is round and is aligned with round section 52 for holding a bottle, cup or the like.

It is preferred that reclining means 68 be provided for making car seat 10 recline so that it may be used, for example, as a comfortable place for a child to sit outside of a car (e.g., on a picnic, etc.) One illustrative reclining means 68 is described in U.S. Pat. No. 4,343,510 to Cone.

In use, before the start of a trip, cover 54 may be released at rear edge 42 of shield 22 and sections 48 of tray 46 may be filled with toys or food. Cover may then be reattached, shield brought into position in front of a child seated in the car seat. When it is time to use the toys or food stored in the shield, cover 54 can be released at rear edge 42 and rotated around shield 22 so that it hangs from front edge 40, exposing the contents of tray 46 for the enjoyment of the child. If tray 46 becomes soiled, it can be easily removed for cleaning, as can cover 54 which is detachable at 58. Tray 46 generally reduces the incidence of spilled toys, food or beverages onto the interior of the vehicle while keeping the items readily within reach of the child.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A child's car seat having a bottom upon which a child can be seated, a back attached to the bottom, side arms attached to the bottom and the back and a shield, said shield being a U-shaped member mounted at its terminal ends to the side arms and movable between a position in front of the child to a position above the child so that the child can be placed in and removed from the car seat, said shield having top and bottom surfaces and front and rear edges, said shield having a recess in the top surface into which is received a tray, said tray divided into sections, at least one of which is circular in cross-section, said shield having an elongated cover of sheet material with first and second ends for wrapping around the front, top and rear of the shield, said cover having an outer layer of fabric over an inner layer of padding material, said cover hiding the tray and having releasable securing means on the first and second ends for making mated engagement with securing means on the shield for retaining the cover in wrapped around condition, said cover having an aperture in registry with the circular section when the cover is wrapped around the shield and secured with said mating securing means, a harness with two shoulder straps and a crotch strap joined to a strap attached to the bottom surface of the shield, said shoulder straps passing through slots provided in the back and said crotch strap passing through a slot in the bottom.

2. The car seat of claim 1 wherein the tray is flush with the top surface of the shield when received in the recess and is removable from the recess.

3. The car seat of claim 2 wherein the tray is divided into sections by dividers and at least one of the dividers is removable.

* * * * *